United States Patent
Asai

(10) Patent No.: US 9,253,378 B2
(45) Date of Patent: Feb. 2, 2016

(54) ROTARY OPERATION UNIT CAPABLE OF REDUCING OPERATION SOUNDS AND ELECTRONIC APPARATUS HAVING THE SAME

(71) Applicant: CANON KABUSHIKI KAISHA, Tokyo (JP)

(72) Inventor: Yoshikazu Asai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/967,799

(22) Filed: Aug. 15, 2013

(65) Prior Publication Data
US 2014/0071301 A1   Mar. 13, 2014

(30) Foreign Application Priority Data

Sep. 13, 2012 (JP) ................................. 2012-201608

(51) Int. Cl.
| | |
|---|---|
| H04N 5/225 | (2006.01) |
| H04N 1/00 | (2006.01) |
| H01H 19/02 | (2006.01) |
| G05G 1/08 | (2006.01) |
| G05G 5/06 | (2006.01) |
| H01H 19/20 | (2006.01) |

(52) U.S. Cl.
CPC ............. *H04N 5/2251* (2013.01); *G05G 5/065* (2013.01); *H01H 19/02* (2013.01); *H01H 19/20* (2013.01); *H04N 1/00397* (2013.01); *G03B 2217/002* (2013.01); *G05G 1/08* (2013.01)

(58) Field of Classification Search
None
See application file for complete search history.

(56) References Cited

U.S. PATENT DOCUMENTS

| | | | | |
|---|---|---|---|---|
| 3,311,718 | A * | 3/1967 | Allison et al. .............. | 200/11 K |
| 4,625,084 | A * | 11/1986 | Fowler et al. ............. | 200/11 DA |
| 4,837,413 | A * | 6/1989 | Schwab et al. ............. | 200/11 R |
| 5,227,595 | A * | 7/1993 | Sorenson ................. | H01H 1/16 |
| | | | | 200/11 J |
| 6,341,202 | B1 * | 1/2002 | Hosokawa et al. .......... | 396/281 |
| 6,459,856 | B2 * | 10/2002 | Kawano ................. | G03B 17/18 |
| | | | | 396/287 |

FOREIGN PATENT DOCUMENTS

JP       2003-087622 A      3/2003

* cited by examiner

*Primary Examiner* — Timothy J Henn
*Assistant Examiner* — Quan Pham
(74) *Attorney, Agent, or Firm* — Cowan, Liebowitz & Latman, P.C.

(57) ABSTRACT

A rotary operation unit capable of reducing operation sounds without lowering operability and operation feeling. A rotary operation member of the rotary operation unit is supported for rotary operation by a dial base and is formed with a receiving recess. In the receiving recess, a click ball is received in a state being in contact with concave-convex portions formed in the dial base at intervals of a predetermined angle in order to provide a click feeling, and a click spring for urging the click ball is also received. A dial cap is attached to the rotary operation member such as to close an opening face of the receiving recess of the rotary operation member, whereby the receiving recess is tightly closed by the dial base and the dial cap.

6 Claims, 6 Drawing Sheets

ROTARY OPERATION UNIT CAPABLE OF REDUCING OPERATION SOUNDS AND ELECTRONIC APPARATUS HAVING THE SAME

BACKGROUND OF THE INVENTION

1. Field of the Invention

The present invention relates to a rotary operation unit that is capable of reducing operation sounds and relates to an electronic apparatus having the rotary operation unit.

2. Description of the Related Art

An electronic image pickup apparatus such as a digital camera is generally configured to receive and photoelectrically convert a photographic light flux by an imaging device such as a CCD sensor or a CMOS sensor, convert an electrical signal output from the imaging device into image data, and store the image data into a recording medium such as a memory card. The image pickup apparatus has rotary operation members for setting photographing conditions and other information.

By operating the rotary operation members, the user can set modes and commands. In a photographing standby state, the user can change setting values of shutter speed and aperture value.

Such a rotary operation member is used in an information setting apparatus for a camera. An information setting apparatus disclosed e.g. in Japanese Laid-open Patent Publication No. 2003-87622 has a mechanism where a click ball is pressed by a click spring against concaves and convexes formed at an outer periphery of a rotatable click plate, thereby providing a click feeling to improve operability and operation feeling.

In recent years, there has been increasing the need for a moving-image photographing function in electronic image pickup apparatuses such as digital single-lens reflex cameras. There has also been demanded a reduction of operation sounds of operation member which are produced at the time of moving-image photographing. On this point, the information setting apparatus disclosed in Japanese Laid-open Patent Publication No. 2003-87622 poses a problem that when the click plate is operated, the click spring and the click ball exposed inside the camera collide with each other to produce large operation sounds.

SUMMARY OF THE INVENTION

The present invention provides a rotary operation unit that is capable of reducing operation sounds without lowering operability and operation feeling, and provides an electronic apparatus having the rotary operation unit.

According to one aspect of this invention, there is provided a rotary operation unit comprising a base member formed with concave-convex portions at intervals of a predetermined angle, a rotary operation member formed with a receiving recess having an opening face and configured to be supported for rotary operation by the base member, a ball member configured to be received in the receiving recess of the rotary operation member in a state abutted against the concave-convex portions of the base member, an elastic member configured to be received in the receiving recess of the rotary operation member and configured to urge the ball member toward the concave-convex portions of the base member, and a lid member configured to be attached to the rotary operation member to close the opening face of the receiving recess of the rotary operation member, wherein the receiving recess of the rotary operation member is tightly closed by the base member and the lid member.

With this invention, operation sounds of the rotary operation member can be reduced without lowering operability and operation feeling. As a result, in an electronic apparatus such as a digital camera, operation sounds become difficult to be recorded in a voiced moving image (moving image with voices), even if the rotary operation member is operated at the time of moving-image photographing, whereby the moving image quality can be improved.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1A:
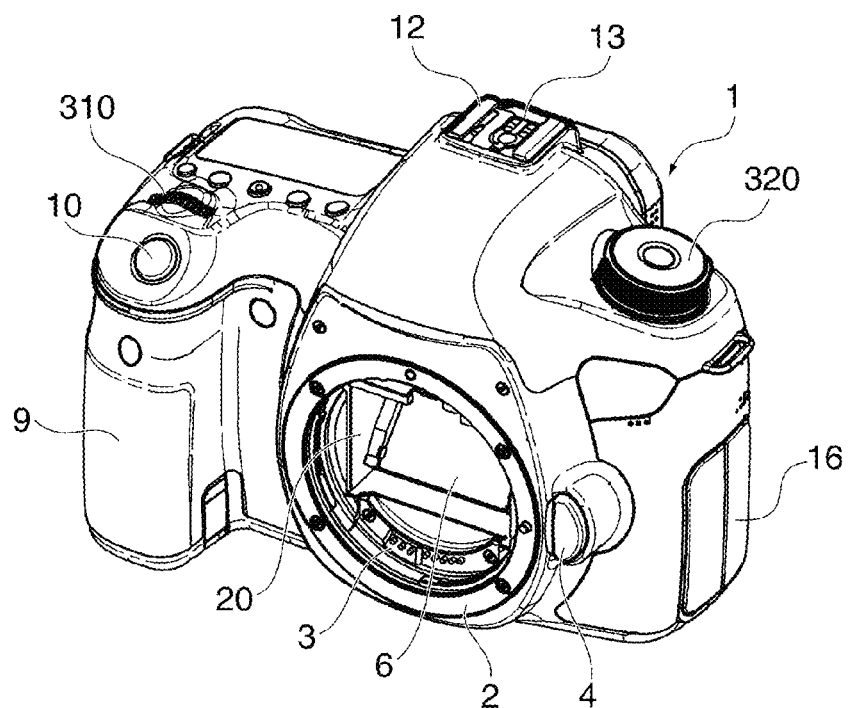
FIGS. 1A and 1B are front and rear perspective views showing an external structure of a digital single-lens reflex camera, which is an example of an electronic apparatus according to one embodiment of this invention.
Figure 1B:
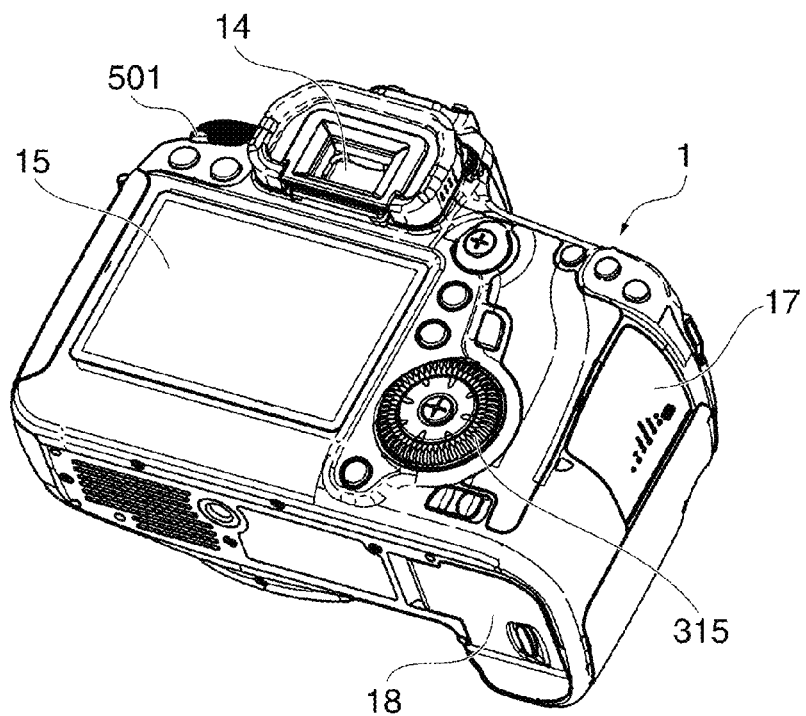
Figure 2:
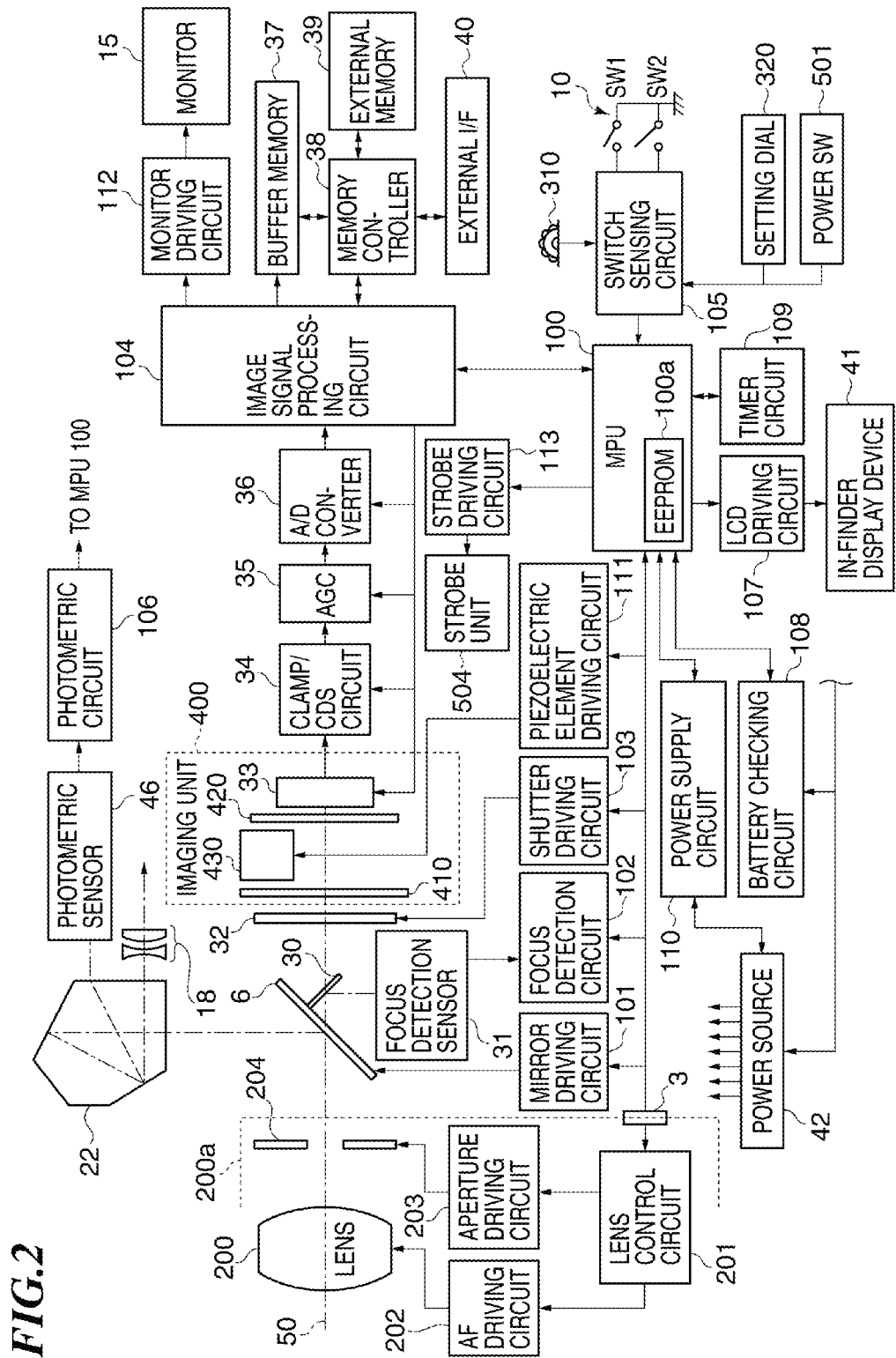
FIG. 2 is a block diagram showing a primary electrical structure of the camera.

FIGS. 1A and 1B show in front and rear perspective views an external structure of a digital single-lens reflex camera, which is an example of an electronic apparatus according to one embodiment of this invention. FIG. 2 shows a primary electrical structure of the camera in block diagram. It should be noted that in FIGS. 1A and 1B there is shown a state where a photographic lens unit 200a (see FIG. 2) is detached from a camera main unit 1. In FIG. 2, the same structural elements as camera constituent parts shown in FIGS. 1A and 1B are denoted by the same reference numerals (Ditto in FIGS. 3 to 6).

As shown in FIG. 1A, the camera main unit 1 is provided at its front face with a mounting portion 2 to which the photographic lens unit 200a can be detachably mounted, and a lens lock release button 4 pressed to detach the photographic lens unit 200a from the mounting portion 2. The mounting portion 2 has mount contacts 3 through which a control signal, status signal, and data signal can be communicated between the camera main unit 1 and the photographic lens unit 200a and through which electric power can be supplied from the camera main unit 1 to the photographic lens unit 200a.

Inside the camera main unit 1, there is provided a mirror box 20 to which a photographic light flux having passed through a photographic lens 200 (see FIG. 2) of the photographic lens unit 200a can be guided. A main mirror (quick return mirror) 6 for reflecting the photographic light flux to a predetermined direction is disposed inside the mirror box 20.

The camera main unit 1 has a grip portion 9 for being gripped by the photographer to hold the camera main unit 1. A release button 10 used by the photographer to instruct the camera to perform photographing is provided above the grip portion 9.

At an upper part of the camera main unit 1, a shoe groove 12 having contacts 13 is provided, to which a camera accessory such as a strobe unit (electronic flash) can be attached. There are also provided a photographic mode setting dial 320 which is a rotary operation member for setting a photographic mode, and a main electronic dial unit 310 which is a rotary operation member for changing setting values such as shutter speed, aperture value, etc.

On the left side of the camera main unit 1, there is provided a terminal cover 16 that protects an external apparatus terminal connector (not shown but corresponding to an external interface 40 in FIG. 2).

As shown in FIG. 1B, on the rear side of the camera main unit 1, there are disposed a power switch 501 for switching ON/OFF operation of the camera, a finder eyepiece window 14 through which the photographer can observe an imaging light flux having been reflected by the main mirror 6, a color liquid crystal monitor 15 that can display an image thereon, and an electronic sub-dial 315 which is a rotary operation member operable by the photographer with the thumb while gripping the grip portion 9.

On the right side of the camera main unit 1, a media cover 17 is provided that is opened and closed when a recording medium (not shown but corresponding to external memory 39 in FIG. 2) is inserted or detached. On a bottom face of the camera main unit 1, there is provided a battery lid 18 for a battery chamber in which a battery (not shown but corresponding to power source 42 in FIG. 2) is accommodated.

As shown in FIG. 2, the camera has an MPU 100 incorporated in the camera main unit 1 and serving to control operations of various parts of the camera. An EEPROM 100a stores timer information of a timer circuit 109 and other information.

The MPU 100 is connected with a mirror driving circuit 101, focus detection circuit 102, shutter driving circuit 103, image signal processing circuit 104, switch sensing circuit 105, photometric circuit 106, LCD driving circuit 107, battery checking circuit 108, timer circuit 109, power supply circuit 110, piezoelectric element driving circuit 111, and strobe driving circuit 113, which operate under the control of the MPU 100. The strobe driving circuit 113 controls operation of a strobe unit 504.

In a state where the photographic lens unit 200a is connected to the mount contacts 3 of the mounting portion 2 of the camera main unit 1, the MPU 100 and a lens control circuit 201 in the photographic lens unit 200a perform communications through the mount contacts 3. The lens control circuit 201 drives the photographic lens 200 and an aperture 204 of the photographic lens unit 200a through an AF driving circuit 202 and an aperture driving circuit 203. It should be noted that only the one photographic lens 200 is illustrated in FIG. 2 for convenience of illustration, but in actuality many lens groups including a focus lens are provided.

The AF driving circuit 202 drives e.g. a stepping motor under the control of the lens control circuit 201 to change a position of the focus lens in the optical axis direction, thereby focusing a photographic light flux on an imaging device 33. The aperture driving circuit 203 is constituted by e.g. an auto-iris and changes an optical aperture value of the aperture 204 under the control of the lens control circuit 201.

The main mirror 6 is movable between a position where it is held at an angle of 45 degrees relative to a photographic optical axis 50 to guide a photographic light flux having passed through the photographic lens 200 to a penta-Dach mirror 22 and a position where it is retracted from a photographic optical path to guide the photographic light flux to the imaging device 33. When the main mirror 6 assumes the position where it guides the photographic light flux to the penta-Dach mirror 22, the main mirror 6 permits a part of the photographic light flux to pass therethrough and to be guided to a sub-mirror 30. The sub-mirror 30 guides the photographic light flux having passed through the main mirror 6 to a focus detection sensor unit 31.

The mirror driving circuit 101 drives e.g. a DC motor and a gear train to move the main mirror 6 between a position where an object image can be observed through the finder eyepiece window 14 and a position where the main mirror 6 is retracted from the photographic optical path. With the movement of the main mirror 6, the sub-mirror 30 moves between a position where it guides the photographic light flux to the focus detection sensor unit 31 and a position where it is retracted from the photographic optical path.

The focus detection sensor unit 31 includes a field lens disposed near an imaging face (not shown), a reflection mirror, a secondary imaging lens, an aperture, and a line sensor having CCDs, and performs focus detection based on a phase difference method. A signal that is output from the focus detection sensor unit 31 is supplied to the focus detection circuit 102 in which the signal is converted into an object image signal for transmission to the MPU 100.

In accordance with the object image signal, the MPU 100 performs focus detection calculation based on a phase difference method to calculate an amount of defocus and a defocus direction. Based on the calculated amount of defocus and the calculated defocus direction, the MPU 100 controls the lens control circuit 201 and the AF driving circuit 202 to move the focus lens of the photographic lens 200 to an in-focus position.

The penta-Dach mirror 22 converts a photographic light flux having been reflected by the main mirror 6 into a normal upright image and reflects it, thereby enabling the photographer to view an object image through the finder eyepiece window 14. The penta-Dach mirror 22 guides a part of the photographic light flux to the photometric sensor 46. The photometric circuit 106 converts an output of the photometric sensor 46 into luminance signals for areas on a viewing surface, and outputs the luminance signals to the MPU 100. Based on the luminance signals, the MPU 100 calculates an exposure value.

A shutter unit 32 is a focal-plane mechanical shutter having front and rear shutter blades, and is driven by the shutter driving circuit 103. When the photographer is observing an object image through the finder eyepiece window 14, the front shutter blade is in a light-shielding position and the rear shutter blade is in an exposure position. At the time of photographing, the front shutter blade moves from the light-shielding position to an exposure position to permit object light to pass therethrough, whereby an image is picked up by the imaging device 33. After lapse of a desired shutter time from the start of exposure, the rear shutter blade moves from the exposure position to a light-shielding position, whereby the photographing is completed.

An imaging unit 400 mainly includes the imaging device 33 that converts an object image into an electrical signal, an optical low-pass filter 410, an imaging device holding member 420, and a piezoelectric element 430, which are integrated into a unit. In this embodiment, a CMOS sensor is used as the imaging device 33. Alternatively, a CCD sensor, a CID sensor, or the like can be used. The optical low-pass filter 410 is disposed in front of the imaging device 33 and constituted by a single birefringent plate, which is made of quartz and formed into a rectangular shape. The piezoelectric element 430 is constituted by a piezoelectric element plate and driven by the piezoelectric element driving circuit 111. As a result, vibration is generated in the piezoelectric element 430 and conveyed to the optical low-pass filter 410, whereby the optical low-pass filter 410 is caused to vibrate.

An analog image signal output from the imaging device 33 is supplied to a clamp/CDS (correlation double sampling) circuit 34. The clamp/CDS circuit 34 performs basic analog processing on the analog image signal, and can change a clamp level. The analog signal processed in the clamp/CDS circuit 34 and output therefrom is supplied to an AGC (auto gain control device) 35 where basic analog processing is performed on the analog signal. It should be noted that the AGC 35 can change a basic AGC level. The analog signal processed in the AGC 35 is supplied to an A/D converter 36 and converted into a digital signal.

The image signal processing circuit 104 performs hardware image processing (such as gamma/knee processing, filter processing, and information synthesis processing for monitor display) on the digital signal supplied from the A/D converter 36. The image data for monitor display output from the image signal processing circuit 104 is supplied through a monitor driving circuit 112 to the color liquid crystal monitor 15 on which the image data is displayed.

In accordance with an instruction from the MPU 100, the image signal processing circuit 104 causes, through a memory controller 38, a buffer memory 37 to store image data, and performs compression processing on image data such as JPEG. In the case of continuous photographing, the image signal processing circuit 104 can cause the buffer memory 37 to temporarily store image data and can sequentially read unprocessed image data from the buffer memory 37 under the control of the memory controller 38. By doing this, the image signal processing circuit 104 is capable of sequentially performing image processing and/or compression processing irrespective of input speed of image data from the A/D converter 36.

The memory controller 38 stores image data input from the external interface 40 into an external memory 39, and outputs image data stored in the external memory 39 to the external interface 40. The external interface 40 is constituted by e.g. an HDMI connector or a USB connector. As the external memory 39, e.g. a flash memory that can be removably mounted to the camera main unit 1 is used.

The switch sensing circuit 105 transmits to the MPU 100 signals that represent operation states of various switches provided in the camera main unit 1. The switch sensing circuit 105 is connected with the release button 10, main electronic dial unit 310, photographic mode setting dial 320, and power switch 501. The release button 10 has a switch SW1 switched on when the release button 10 is pressed by a first stroke (i.e., half-pressed) and a switch SW2 switched on when the release button 10 is pressed by a second stroke (i.e., fully pressed). When the switch SW2 is switched on, a photographing start instruction is transmitted to the MPU 100.

In accordance with instructions from the MPU 100, the LCD driving circuit 107 drives an LCD panel (not shown) and an in-finder display device 41, and the battery checking circuit 108 checks a battery of the power source 42 that supplies operating power to respective parts of the camera main unit 1 and the photographic lens unit 200a, and transmits a result of the checking to the MPU 100. The timer circuit 109 measures a date and a time period from when the power switch 501 is turned off to when the power switch 501 is next turned on, and transmits a result of the measurement to the MPU 100 in accordance with an instruction from the MPU 100.

In the following, a description will be given in detail of the structure of the main electronic dial unit 310, which is one of the rotary operation units provided in the camera main unit 1.

Figure 3A:
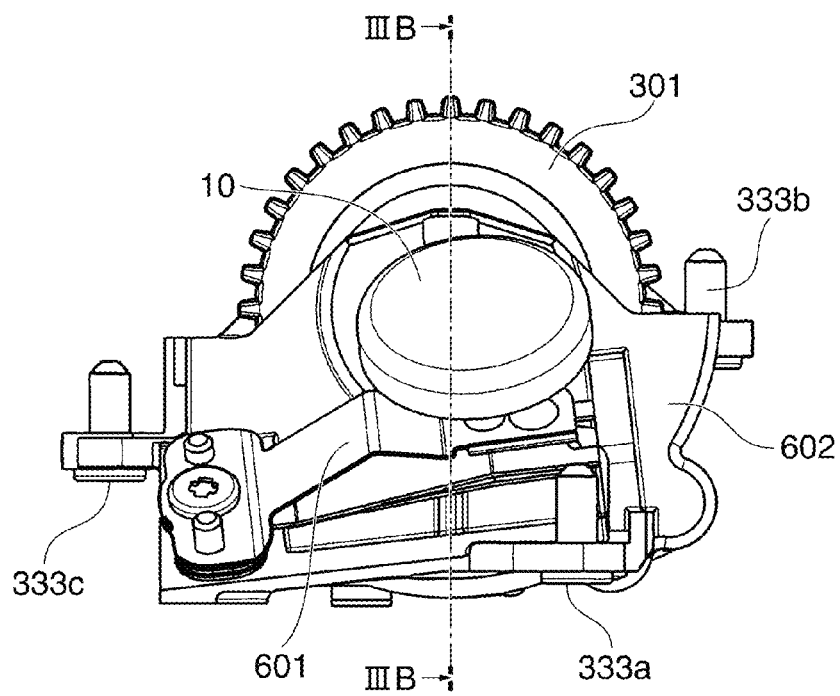
FIG. 3A is a front perspective view showing the structure of a dial unit of the camera.
Figure 3B:
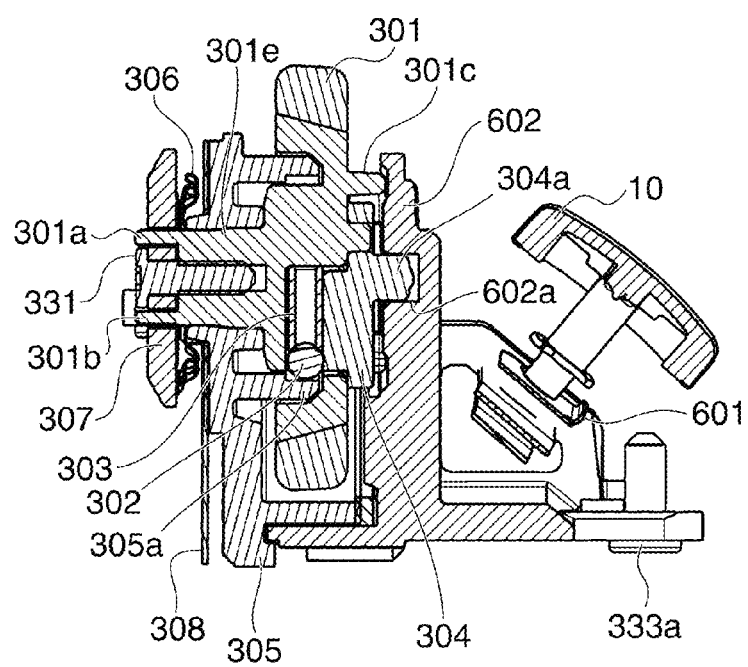
FIG. 3B is a section view taken along line IIIB-IIIB shown in FIG. 3A.
Figure 4:
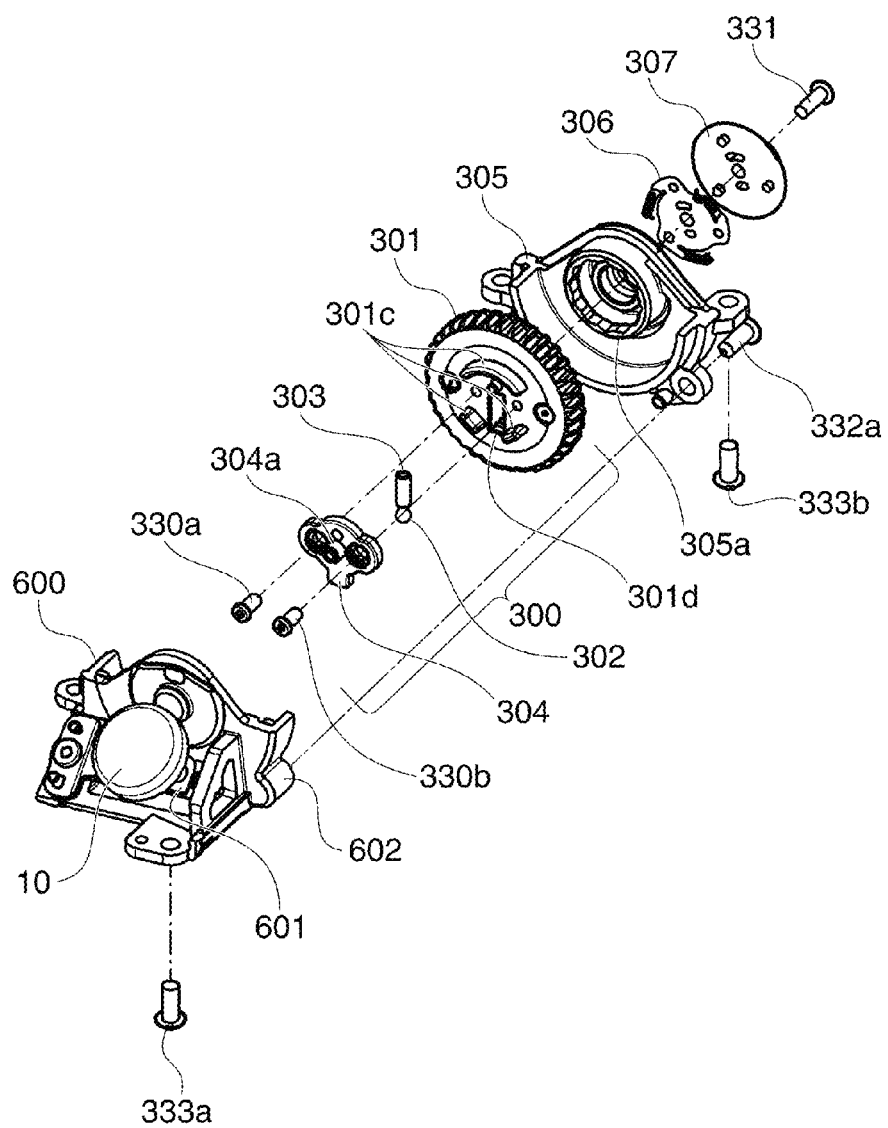
FIG. 4 is an exploded front perspective view of the dial unit.
Figure 5:
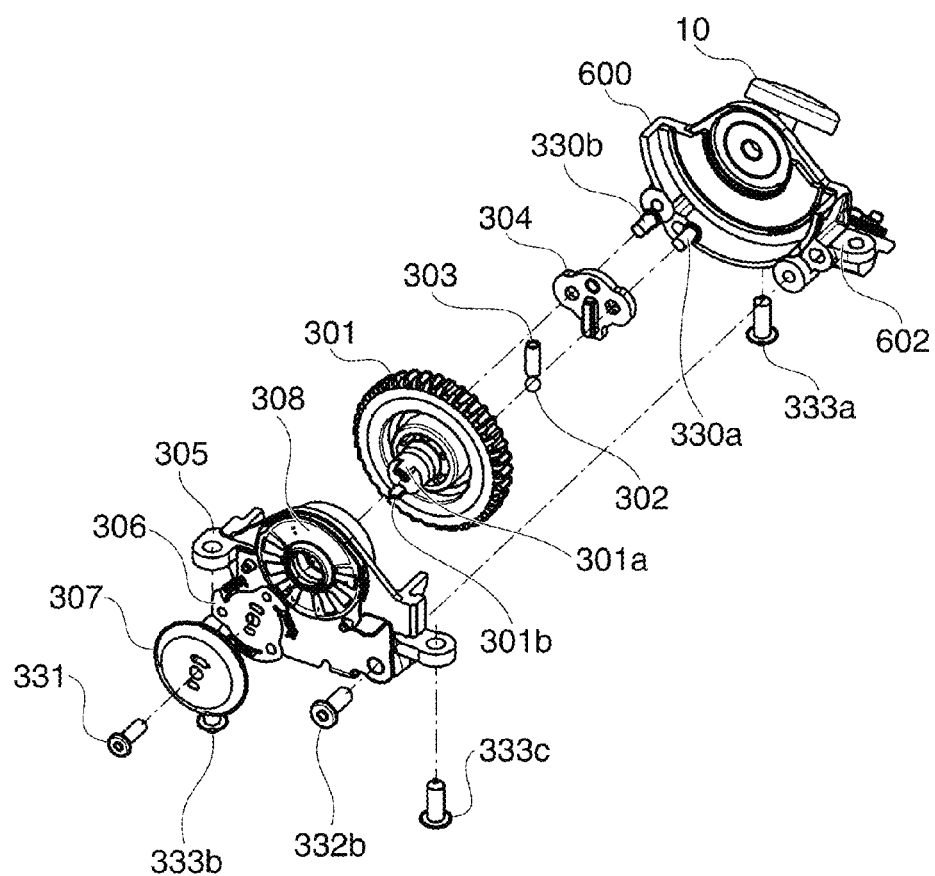
FIG. 5 is an exploded rear perspective view of the dial unit.

FIG. 3A shows the structure of the main electronic dial unit 310 in front perspective view, and FIG. 3B is a section view taken along line IIIB-IIIB shown in FIG. 3A. FIGS. 4 and 5 show the structure of the main electronic dial unit 310 in exploded front and rear perspective views.

As shown in FIGS. 3 to 5, a release unit 600 that includes the release button 10, a release switch 601, and a release base member 602 is disposed on the object side of the main electronic dial unit 310.

The main electronic dial unit 310 has a circular shaped rotary operation member 301 shown in FIGS. 3 to 5. While holding the grip portion 9, the user can operate and rotate the rotary operation member 301 with forefinger. In a photographing standby state, it is possible to change settings of shutter speed and aperture value by operating the rotary operation member 301. The main electronic dial unit 310 is also used to select a command on a menu displayed on the color liquid crystal monitor 15 and select a photographed image or a photographed moving image.

The rotary operation member 301 of the main electronic dial unit 310 has a receiving recess 301d and a shaft portion 301e (see FIGS. 3B and 4), and is formed with knurling on the outer periphery thereof to prevent slippage. The shaft portion 301e of the rotary operation member 301 and a portion of the rotary operation member 301 where the receiving recess 301d is formed are made of a synthetic resin material (e.g., polycarbonate), whereas an outer peripheral portion of the rotary operation member 301 is made of elastomer (e.g., synthetic rubber or thermoplastic elastomer), thereby satisfying both durability and operability. It should be noted that the rotary operation member 301 can be formed by two-color molding of synthetic resin material and elastomer.

A click ball 302 and a click spring 303 are incorporated into the receiving recess 301d of the rotary operation member 301. The click spring 303 urges the click ball 302 toward the outer periphery of the rotary operation member 301. The click ball 302 serving as a ball member is a spherical body that is made of a metal material or a synthetic resin material. The click spring 303 serving as an elastic member is constituted by a compression coil spring or the like.

A dial structure 300 is assembled by incorporating the click ball 302 and the click spring 303 into the receiving recess 301d and by fixing a dial cap 304 (which is a lid member) to the rotary operation member 301 by screws 330a and 330b. As a result, an opening face of the receiving recess 301d is closed by the dial cap 304, thereby preventing the click ball 302 and the click spring 303 from being detached from the receiving recess 301d.

Figure 6A:
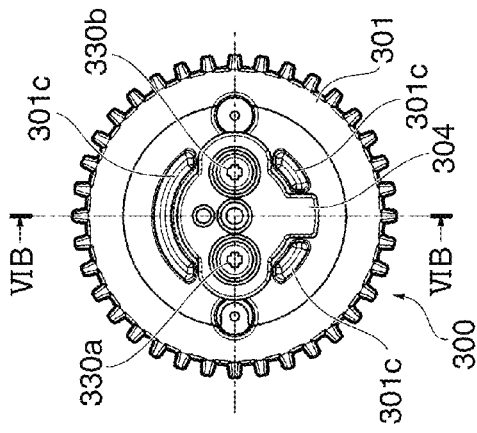
FIG. 6A is a rear view showing a state where a click ball and a click spring are incorporated into a receiving recess of a dial member of the dial unit.
Figure 6B:
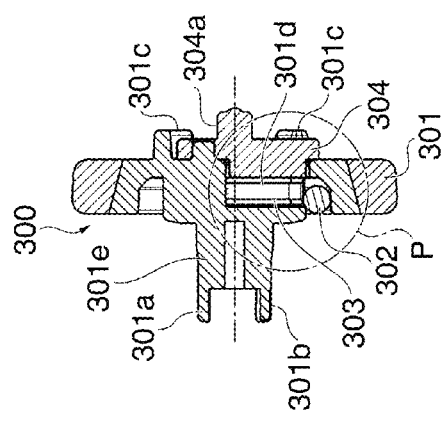
FIG. 6B is a section view taken along line VIB-VIB shown in FIG. 6A.
Figure 6C:
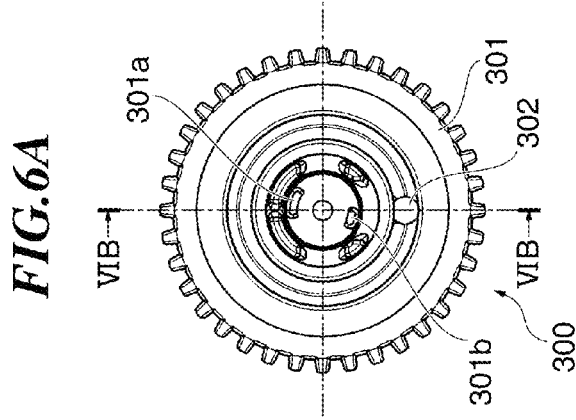
FIG. 6C is a front view of the dial unit into which the click ball and the click spring are incorporated.
Figure 6D:
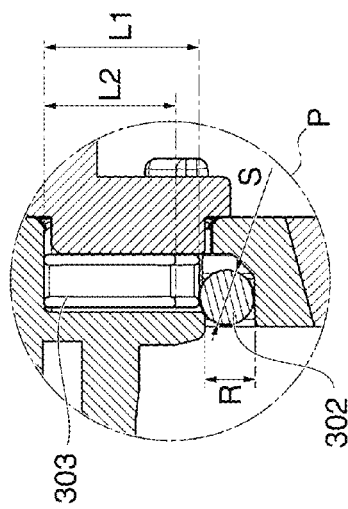
FIG. 6D is an enlarged view of a P part shown in FIG. 6B.

FIG. 6A shows the structure of the dial structure 300 in rear view, FIG. 6B is a section view taken along line VIB-VIB shown in FIGS. 6A and 6C, FIG. 6C shows the dial structure 300 in front view, and FIG. 6D is an enlarged view of a P part shown in FIG. 6B.

In FIG. 6D, symbol S denotes the diameter of the click ball 302 and symbol R denotes the diameter of an opening portion of the receiving recess 301d on the rear side of the camera. Symbols L1, L2 respectively denote lengths of the click spring 303 before and after the click ball 302 is incorporated into the receiving recess 301d.

The dial structure 300 is configured to satisfy relations of S>R and L1>L2. As a result, the click ball 302 is prevented from being detached from the receiving recess 301d and the click spring 303 is prevented from running off the receiving recess 301d when the click ball 302 is incorporated into the receiving recess 301d while compressing the click spring 303. Thus, assembly workability can be improved.

As shown in FIG. 3B, the shaft portion 301e of the rotary operation member 301 of the dial structure 300 is inserted into a central through hole formed in a dial base 305 that serves as a base member, and is supported for rotary operation at the central through hole. The shaft portion 301e functions as a rotary shaft of the dial structure 300. The dial structure 300 including the rotary operation member 301 is supported for rotary operation by the dial base 305.

As shown in FIGS. 3B and 4, the dial base 305 is formed with a ring shaped protrusion 305a. A plurality of (e.g., twelve) concave-convex portions are formed on an inner peripheral surface (inner surface) of the ring shaped protrusion 305a at intervals of a predetermined angle. The click ball 302 is pressed against the inner peripheral surface of the ring shaped protrusion 305a by an urging force of the click spring 303. When the rotary operation member 301 is operated to rotate, a position where the click ball 302 is pressed against the inner peripheral surface of the ring shaped protrusion 305a changes, whereby a click feeling is provided at intervals of the predetermined angle (30 degrees in this example).

An electronic dial contact piece 306 is disposed on a rear side of the dial base 305 and fixed by thermal caulking to a contact piece holding member 307 that is disposed on a rear side of the dial contact piece 306. It should be noted that the method of fixing the electronic dial contact piece 306 is not limited to thermal caulking. For example, the electronic dial contact piece 306 can be fixed to the contact piece holding member 307 by using an adhesive tape or adhesive agent.

As shown in FIGS. 3B and 5, a dial flexible printed circuit board 308 is fixed to a rear face of the dial base 305 by e.g. an adhesive tape. The contact piece holding member 307 fixed with the electronic dial contact piece 306 is positioned by tip protrusions 301a, 301b of the shaft portion 301e of the rotary operation member 301 and fixed to the shaft portion 301e by a screw 331, whereby the electronic dial contact piece 306 is connected to a pattern surface of the dial flexible printed circuit board 308.

As shown in FIGS. 4 and 5, the dial base 305 is fixed to the release base member 602 by screws 332a, 332b. The release base member 602 and the dial base 305 are fixed to an exterior cover (not shown) by screws 333a, 333b, and 333c.

As described above, when the dial structure 300 is rotated while performing a click operation at the time of operation of the main electronic dial unit 310, sounds are produced by e.g. collision of the click ball 302 with the concave-convex portions that are formed in the inner surface of the ring shaped protrusion 305a at intervals of the predetermined angle. However, the produced sounds are hardly conveyed to the outside since the click ball 302 and the click spring 303 are tightly closed by the rotary operation member 301, the dial cap 304, and the dial base 305 in this embodiment. Accordingly, even if the main electronic dial unit 310 is operated during moving-image photographing, operation sounds becomes difficult to be mixed into a voiced moving image photographed by the camera. This makes it possible to maintain high quality of moving image.

The main electronic dial unit 310 (rotary operation unit) of this embodiment is configured that a position (click operation portion) where the click ball 302 is urged by the click spring 303 and a position (fitting portion) where the shaft portion 301e of the rotary operation member 301 is fitted into the hole of the dial base 305 do not overlap each other in a thrust direction of the rotary operation member 301. In an arrangement where the click operation portion and the fitting portion overlap each other in the thrust direction, the dial becomes large in diameter. On the other hand, according to the arrangement of this embodiment where the click operation portion and the fitting portion are offset from each other in the thrust direction, the dial can be designed to have an arbitrary diameter, whereby optimum operability can be attained.

It should be noted that in a case where the click operation portion and the fitting portion are offset from each other in the thrust direction as with this embodiment, there is a fear that the dial structure 300 is inclined when an operation force is applied to the rotary operation member 301. To obviate this, in the present embodiment, an auxiliary fitting convex portion 304a that functions as a rotation shaft of the dial structure 300 is formed on the dial cap 304 and an auxiliary fitting concave portion 602a that rotatably supports the auxiliary fitting convex portion 304a is formed in the release base member 602 that functions as the base member, as shown in FIG. 3B. Furthermore, a plurality of protrusion portions 301c are formed in the rotary operation member 301 so as to be in contact with the release base member 602 in the thrust direction. With such construction, the dial structure 300 (rotary operation member 301) is prevented from being inclined when the main electronic dial unit 310 is operated, whereby satisfactory operability can be maintained.

In the above-described embodiment, the digital single-lens reflex camera is used as the electronic apparatus of this invention, but this is not limitative. The present invention is also applicable to a digital video camera or other electronic apparatus that has at least one of the above-described rotary operation members.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-201608, filed Sep. 13, 2012, which is hereby incorporated by reference herein in its entirety.

What is claimed is:

1. A rotary operation unit comprising:
a first base member formed with concave-convex portions at intervals of a predetermined angle;
a rotary operation member formed with a receiving recess having an opening face;
a ball member configured to be received in the receiving recess of the rotary operation member;
an elastic member configured to be received in the receiving recess of the rotary operation member so as to urge the ball member; and
a lid member configured to be attached to the rotary operation member to close the opening face of the receiving recess of the rotary operation member,
wherein the rotary operation member includes a first shaft portion,
wherein the first base member includes a first fitting portion into which the first shaft portion is fitted,
wherein in a case where the first shaft portion is not fitted into the first fitting portion, the elastic member urges the ball member so that the ball member abuts an inside surface of the receiving recess, and wherein in a case where the first shaft portion is fitted into the first fitting portion, the concave-convex portions of the first base member is disposed between the ball member and the inside surface of the receiving recess so that the ball member abuts the concave-convex portions of the first base member.

2. The rotary operation unit according to claim 1,
wherein a contact member is fixed to the first shaft portion, and
wherein a circuit board is disposed on the first base member so that the contact member is connected to the circuit board.

3. The rotary operation unit according to claim 1, further comprising:
a second base member fixed to the first base member,
wherein the lid member includes a second shaft portion, and
wherein the second base member includes a second fitting portion into which the second shaft portion is fitted.

4. An electronic apparatus having a rotary operation unit, comprising:
a first base member formed with concave-convex portions at intervals of a predetermined angle;
a rotary operation member formed with a receiving recess having an opening face;
a ball member configured to be received in the receiving recess of the rotary operation member;
an elastic member configured to be received in the receiving recess of the rotary operation member so as to urge the ball member; and
a lid member configured to be attached to the rotary operation member to close the opening face of the receiving recess of the rotary operation member,
wherein the rotary operation member includes a first shaft portion,
wherein the first base member includes a first fitting portion into which the first shaft portion is fitted,
wherein in a case where the first shaft portion is not fitted into the first fitting portion, the elastic member urges the ball member so that the ball member abuts an inside surface of the receiving recess, and
wherein in a case where the first shaft portion is fitted into the first fitting portion, the concave-convex portions of the first base member is disposed between the ball member and the inside surface of the receiving recess so that the ball member abuts the concave-convex portions of the first base member.

5. The electronic apparatus according to claim 4,
wherein a contact member is fixed to the first shaft portion, and
wherein a circuit board is disposed on the first base member so that the contact member is connected to the circuit board.

6. The electronic apparatus according to claim 4, further comprising:
a second base member fixed to the first base member,
wherein the lid member includes a second shaft portion, and
wherein the second base member includes a second fitting portion into which the second shaft portion is fitted.

* * * * *